(12) United States Patent
Bradley (10) Patent No.: US 12,198,551 B2
(45) Date of Patent: Jan. 14, 2025

(54) DRONE WARNING SYSTEM FOR PREVENTING WRONG-WAY COLLISIONS (71) Applicant: James P. Bradley, Dallas, TX (US)

(72) Inventor: James P. Bradley, Dallas, TX (US)

(*) Notice: Subject to any disclaimer, the term of this patent is extended or adjusted under 35 U.S.C. 154(b) by 0 days.

(21) Appl. No.: 18/385,678

(22) Filed: Oct. 31, 2023

(65) Prior Publication Data
US 2024/0257643 A1 Aug. 1, 2024

Related U.S. Application Data (63) Continuation of application No. 18/103,708, filed on Jan. 31, 2023, now abandoned.

(51) Int. Cl.
| G08G 1/16 | (2006.01) |
| B64U 10/20 | (2023.01) |
| B64U 20/80 | (2023.01) |
| B64U 70/93 | (2023.01) |
| B64U 80/25 | (2023.01) |
| B64U 101/20 | (2023.01) |
| B64U 101/30 | (2023.01) |
| G08G 1/01 | (2006.01) |
| G08G 1/09 | (2006.01) |

(52) U.S. Cl.
CPC ............. *G08G 1/164* (2013.01); *B64U 10/20* (2023.01); *B64U 20/80* (2023.01); *B64U 70/93* (2023.01); *B64U 80/25* (2023.01); *G08G 1/0145* (2013.01); *G08G 1/091* (2013.01); *B64U 2101/20* (2023.01); *B64U 2101/30* (2023.01)

(58) Field of Classification Search
CPC ...... G08G 1/164; G08G 1/0145; G08G 1/091; B64U 80/25; B64U 20/80; B64U 70/93; B64U 10/20; B64U 2101/30; B64U 2101/20
See application file for complete search history.

(56) References Cited

U.S. PATENT DOCUMENTS

| 6,084,510 A * | 7/2000 | Lemelson | G08G 1/164 382/104 |
| 6,420,977 B1 * | 7/2002 | Corbitt | B61L 29/246 348/E7.087 |
| 7,167,799 B1 * | 1/2007 | Dolgov | G08G 1/164 701/469 |
| 9,640,072 B2 * | 5/2017 | White | E01F 13/06 |

(Continued)

*Primary Examiner* — Luis A Martinez Borrero
(74) *Attorney, Agent, or Firm* — Terrile, Cannatti & Chambers, LLP; Michael Rocco Cannatti (57) ABSTRACT A roadway safety system, method, and apparatus are provided for preventing a wrong-way collisions on roadways and exit ramps of roadways by maintaining robotic drones at a drone docking station located along the roadway and/or at or near an exit ramp of the roadway; monitoring the exit ramp to detect a wrong-way vehicle that enters the exit ramp in a wrong direction; transmitting a first communication signal to a safety control system upon detecting the wrong-way vehicle; launching at least a first robotic drone from the one or more robotic drones toward the wrong-way vehicle in response to the first communication signal; and generating an alert or warning message from at least the first robotic drone to notify a driver of the wrong-way vehicle that the wrong-way vehicle is traveling in the wrong direction.

13 Claims, 5 Drawing Sheets

(56) References Cited

U.S. PATENT DOCUMENTS

| | | | |
|---|---|---|---|
| 9,704,409 B2* | 7/2017 | Prakash | G06Q 10/083 |
| 9,805,596 B2* | 10/2017 | Al-Deek | G08G 1/056 |
| 10,089,878 B2* | 10/2018 | Cummings, II | G08G 1/075 |
| 10,109,192 B2* | 10/2018 | Al-Deek | G06V 20/54 |
| 10,156,848 B1* | 12/2018 | Konrardy | G07C 5/0808 |
| 10,169,988 B2* | 1/2019 | Kozloski | G06V 20/176 |
| 10,173,776 B2* | 1/2019 | Goldberg | G05D 1/0011 |
| 10,287,014 B2* | 5/2019 | Erickson | G08G 5/0039 |
| 10,351,131 B2* | 7/2019 | Al-Deek | G08G 1/167 |
| 10,380,694 B1* | 8/2019 | Grant | G08G 1/012 |
| 10,421,453 B1* | 9/2019 | Ferguson | B60W 60/00276 |
| 10,926,654 B1* | 2/2021 | Thrun | B64D 27/24 |
| 10,988,251 B2* | 4/2021 | Georges | B64D 47/02 |
| 11,295,613 B1* | 4/2022 | Bradley | G06V 20/52 |
| 11,322,024 B2* | 5/2022 | Duran | G08G 1/127 |
| 11,417,207 B2* | 8/2022 | Bradley | E01F 13/048 |
| 11,488,393 B2* | 11/2022 | May | G06V 20/584 |
| 11,527,154 B2* | 12/2022 | McFarland, Jr. | B60Q 9/008 |
| 11,735,042 B1* | 8/2023 | Okezie | G08G 1/09 340/905 |
| 11,837,082 B2* | 12/2023 | McFarland, Jr. | B60Q 9/00 |
| 11,939,080 B2* | 3/2024 | Cowden | B64U 80/30 |
| 2004/0107027 A1* | 6/2004 | Boudrieau | B64D 45/0015 701/1 |
| 2005/0156758 A1* | 7/2005 | Gilliss | G08G 1/164 340/932.2 |
| 2012/0019522 A1* | 1/2012 | Lawrence | G06T 17/00 345/419 |
| 2012/0179518 A1* | 7/2012 | Jaipaul | G06Q 30/0241 701/117 |
| 2014/0320318 A1* | 10/2014 | Victor | G08G 1/146 340/932.2 |
| 2015/0146001 A1* | 5/2015 | White | E01F 13/105 348/149 |
| 2015/0252540 A1* | 9/2015 | Lee | E01F 9/529 404/6 |
| 2016/0027300 A1* | 1/2016 | Raamot | G08G 1/0145 340/922 |
| 2016/0054143 A1* | 2/2016 | Abuelsaad | G01C 21/3688 701/431 |
| 2016/0059962 A1* | 3/2016 | Abuelsaad | G08G 1/096716 701/3 |
| 2016/0117929 A1* | 4/2016 | Chan | G08G 5/0026 701/3 |
| 2016/0117931 A1* | 4/2016 | Chan | G08G 5/0069 701/120 |
| 2016/0117933 A1* | 4/2016 | Chan | G08G 5/0069 705/317 |
| 2016/0189550 A1* | 6/2016 | Chan | G08G 5/0086 701/3 |
| 2016/0196756 A1* | 7/2016 | Prakash | B64U 70/95 701/3 |
| 2017/0018178 A1* | 1/2017 | Poechmueller | G08G 1/09626 |
| 2017/0069214 A1* | 3/2017 | Dupray | G08G 5/0008 |
| 2017/0103656 A1* | 4/2017 | Cummings, II | G08G 1/07 |
| 2017/0323572 A1* | 11/2017 | Chan | G08G 5/006 |
| 2018/0029706 A1* | 2/2018 | Baruch | B64U 10/13 |
| 2018/0035276 A1* | 2/2018 | Kang | H04W 72/02 |
| 2018/0050693 A1* | 2/2018 | Al-Deek | B62D 15/0255 |
| 2018/0061235 A1* | 3/2018 | Goldberg | B60Q 7/00 |
| 2018/0072414 A1* | 3/2018 | Cantrell | B64U 10/13 |
| 2018/0075743 A1* | 3/2018 | Al-Deek | G06V 20/54 |
| 2018/0233038 A1* | 8/2018 | Kozloski | G08G 1/0175 |
| 2018/0342156 A1* | 11/2018 | Martin | G08G 1/052 |
| 2018/0346116 A1* | 12/2018 | Kundu | B60W 40/06 |
| 2019/0147260 A1* | 5/2019 | May | B60W 50/14 382/103 |
| 2019/0301116 A1* | 10/2019 | Lee | G08G 1/017 |
| 2020/0126413 A1* | 4/2020 | Sham | G08G 1/165 |
| 2020/0175289 A1* | 6/2020 | May | G06V 20/584 |
| 2020/0193847 A1* | 6/2020 | Shannon | G08G 5/0026 |
| 2020/0257319 A1* | 8/2020 | Taveira | G05D 1/12 |
| 2020/0320875 A1* | 10/2020 | Lacaze | G05D 1/0246 |
| 2021/0020040 A1* | 1/2021 | Bradley | G06V 20/54 |
| 2021/0027624 A1* | 1/2021 | Oberdanner | H04W 4/38 |
| 2021/0158688 A1* | 5/2021 | Lau | G07B 15/063 |
| 2021/0264778 A1* | 8/2021 | McFarland, Jr. | B60W 30/09 |
| 2022/0108606 A1* | 4/2022 | Bradley | G08G 1/042 |
| 2022/0116820 A1* | 4/2022 | Avedisov | H04Q 9/00 |
| 2022/0129014 A1* | 4/2022 | Ota | G05D 1/0248 |
| 2022/0130260 A1* | 4/2022 | Ota | G08G 5/0034 |
| 2022/0169401 A1* | 6/2022 | Di Cosola | B64U 70/95 |
| 2022/0208002 A1* | 6/2022 | Bradley | G08G 1/02 |
| 2023/0087725 A1* | 3/2023 | McFarland, Jr. | G08G 1/0133 701/23 |
| 2023/0089424 A1* | 3/2023 | Moeykens | B64U 50/37 701/16 |
| 2023/0254365 A1* | 8/2023 | Matsuo | H04L 67/1008 709/224 |

* cited by examiner

DRONE WARNING SYSTEM FOR PREVENTING WRONG-WAY COLLISIONS

CROSS-REFERENCE TO RELATED APPLICATIONS

This application is a continuation of co-pending application Ser. No. 18/103,708, filed on Jan. 31, 2023, the contents of which are incorporated herein in its entirety by reference.

BACKGROUND OF THE INVENTION

Field of the Invention

The present disclosure generally relates to the field of vehicle traffic monitoring and safety systems. In one aspect, the present invention relates to a roadway safety system to reduce or prevent wrong-way collisions on a roadway, such as a tollway, freeway or highway.

Description of the Related Art

Wrong-way drivers present a danger to the public traveling on roadways. Wrong-way drivers cause collisions, often times head-on collisions, that result in serious injuries or death. Once a wrong-way driver is traveling in the wrong direction on a roadway, the closing speed between the two vehicles approaching at high speeds, perhaps 70 mph, from opposite directions makes it difficult or impossible for the driver of the vehicle proceeding in the right direction on the roadway to take evasive action to avoid a collision. In addition, roadways are often constructed with a median barrier and little or no shoulder room on the roadway, which further limits the ability of a driver of the vehicle traveling in the correct direction to take evasive action to avoid a collision.

Studies have shown that wrong-way collisions are often caused by drivers whose judgment is impaired because they are under the influence of alcohol or drugs. These studies have also shown that elderly drivers may become confused and drive the wrong-way onto an exit ramp which allows them to enter the roadway in the wrong direction. "Wrong-way" signs have been used for years to try to alert drivers that they are traveling in the wrong direction on a roadway. In addition, various static or fixed warning systems have been deployed to activate visual or audio alarms upon detecting the presence of a wrong-way vehicle traveling the wrong direction on a roadway or the exit ramp. However, a wrong-way driver who is under the influence of alcohol or drugs or who is confused is not likely to heed a warning sign or see or hear and respond to alarms. Importantly, wrong-way drivers need to be stopped on the exit ramp before they enter the roadway in the wrong direction.

As seen from the foregoing, the existing vehicle traffic monitoring and roadway safety systems are ineffective due in large part to the challenges of using stationary visual or audible warnings that require the driver to find and recognize them from a distance while the vehicle is moving in order to prevent the driver from entering the roadway in the wrong direction.

BRIEF SUMMARY

A roadway safety system, method, and apparatus launches one or more drones immediately upon sensors detecting the presence of a wrong way vehicle traveling in the wrong direction on the roadway and/or the exit ramp of a tollway or a highway. Each drone may be stored, charged, and maintained in a drone docking station(s) at the exit ramp or in remote locations along the roadway. The roadway safety system continuously monitors the exit ramp and/or the roadway to determine when a vehicle enters in the wrong direction. In response to detecting a wrong-way vehicle, the roadway safety system launches the drone(s) which may be programmed to travel toward the wrong-way vehicle. In operation, the drone(s) are preprogrammed to fly in front of the wrong-way vehicle to alert the driver through visual and/or audible signals. The drone(s) could also be preprogrammed to attach to the vehicle's windshield or body, such as the roof top or hood, to further provide visual and/or audible warnings to the driver. Once attached to the vehicle, the drone may be programmed to display or broadcast a warning to other drivers of the location and presence of a wrong-way vehicle. Each attached drone could also have a global position system (GPS) unit that is configured to identify a location of the wrong-way vehicle for transmission to a command center or to otherwise broadcast the location of the wrong-way vehicle. In addition, the drone(s) flying alongside or flying above the vehicle could have a camera attached to send images of the vehicle and driver to a central command center. In selected embodiments, the roadway safety system may immediately generate and send an alert to a command center which identifies the wrong-way vehicle and/or the vehicle's location either by a GPS device on the drone(s) or by identifying the exact exit ramp from which they were launched. In addition, this roadway safety system may launch one or more additional drones that alert oncoming traffic of the presence of a wrong-way vehicle that has entered the roadway in the wrong direction. These additional drones could travel in the direction towards vehicles traveling in the right direction on the tollway toward this exit ramp and display visual signals that a wrong way driver is ahead of them. The central command center may also have the ability to maintain two-way communications with the robotic drones and to control their movements and the alerts that they provide.

BRIEF DESCRIPTION OF THE DRAWINGS

The present invention may be understood, and its numerous objects, features and advantages obtained, when the following detailed description of a preferred embodiment is considered in conjunction with the following drawings.

It will be appreciated that for simplicity and clarity of illustration, elements illustrated in the drawings have not necessarily been drawn to scale. For example, the dimensions of some of the elements are exaggerated relative to other elements for purposes of promoting and improving clarity and understanding.

DETAILED DESCRIPTION

A roadway safety system, method and device to reduce or eliminate collisions caused by wrong-way drivers on a roadway is disclosed with reference to a computer-controlled system for monitoring and promptly detecting a vehicle that is about to violate the rules of the road by entering an exit ramp in the wrong direction from a street or another roadway. The sensors for detecting wrong-way vehicles may include magnetic sensors, electronic sensors, photoelectric sensors, cameras and/or physical sensors that are positioned or located in, nearby or above or over the exit ramp. The physical sensors could operate by detecting the order in which mechanical pedals or bars are depressed by a vehicle's tires passing over them. The detection of the direction of the vehicle traveling on the roadway may also be accomplished by two sensors in, by or over the exit ramp that detect the direction of travel from the order in which the sensors are activated, such as breaking the beams of light of a pair of electronic eyes. Once a wrong-way vehicle is detected, the disclosed roadway safety system may deploy preprogrammed robotic drones from drone docking stations where they can be charged or otherwise powered to enable the electric motors of drones to propel the drones for controlled flight. The computer programmed and controlled roadway safety system responds to the detection of a wrong-way vehicle to cause the drones to be launched from the drone docking stations. Sensors on the drones or in the vicinity of the exit ramp are used to locate the wrong-way vehicle, and the drones are programmed to fly in advance of and in front of the wrong-way vehicle. The drones are programmed to fly at a height and position so that they are visible to the driver. The drones are equipped with visual signs and/or flashing lights to alert the driver that the vehicle is traveling in the wrong direction. In addition, the drones may include a speaker for broadcasting an audible alarm that the vehicle is traveling in the wrong direction. In addition, drones may be programmed to be launched to display or broadcast a warning of the presence of a wrong-way vehicle to drivers traveling in the correct direction ahead of the wrong-way vehicle.

In selected embodiments, the road safety system may be configured to provide a signal to a central command center of the tollway or roadway that a vehicle has entered the wrong-way at this particular exit ramp. The roadway safety system may include communicating audible and visual images of the wrong-way vehicle and driver to the central command center. The drones may include a two-way communication system with the command center to allow the command center to control visual and or audible alerts to the wrong-way driver, including directions for stopping and turning around. The central command center is also able to take control of maneuvering the drones and the alerts that they provide.

The roadway safety system may also include one or more drones that are launched when a wrong-way vehicle is detected, where these drones are flown above the lanes of traffic ahead of the exit ramp and towards oncoming vehicles that are traveling in the correct direction. These drones may also be programmed to hover above the roadway at or some distance from the entrance to the exit ramp. These drones may include flashing lights, visual signage or audible sounds to alert these drivers of the danger from a vehicle attempting to enter an exit ramp ahead of them in the wrong direction.

The roadway safety system may also include equipping the drones with attachment devices, such as suction cups, magnets, or other technology for attaching the drone to the body of the vehicle, such as the hood, roof or even the front windshield. Once attached to the wrong-way vehicle, the drones may generate lights or sounds to alert the driver of the wrong-way vehicle as well as the drivers of vehicles put in harm's way by the wrong-way vehicle.

Various illustrative embodiments of the present invention will now be described in detail with reference to the accompanying figures which illustrate different views of a drone warning system for preventing roadway accidents caused by wrong-way collisions. While various details are set forth in the following description, it will be appreciated that the present invention may be practiced without the specific details, and that numerus implementation-specific decisions may be made to the invention described herein to achieve the device designer's specific goals, such a compliance with mechanical, electrical and/or design-related constraints, which will vary from one implementation to another. While such a development effort might be complex and time-consuming, it would nevertheless be a routine undertaking for those of ordinary skill in the art having the benefit of this disclosure. For example, selected aspects are depicted with reference to simplified plan and perspective views of a road safety system without including every device feature or geometry in order to avoid limiting or obscuring the present invention. Such descriptions and representations are used by those skilled in the art to describe and convey the substance of their work to others skilled in the art.

Figure 1:
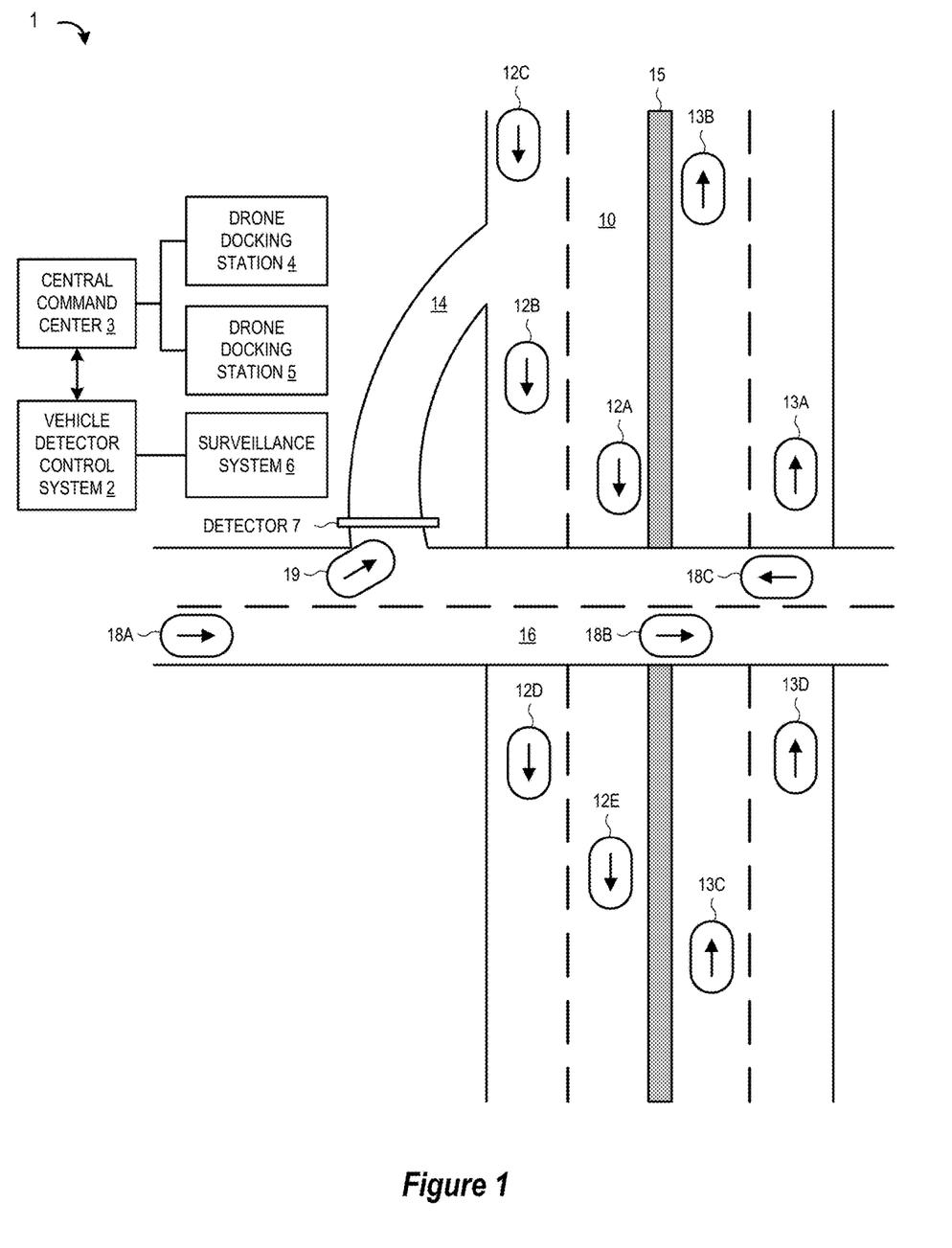
FIG. 1 shows a schematic view of a junction of two roadways connected by an exit ramp in accordance with selected embodiments of the present disclosure.

To provide additional details for an improved understanding of selected embodiments of the present disclosure, reference is now made to FIG. 1 which depicts an overhead view 1 of a portion of a roadway 10 showing vehicles 12A, 12B, 12C, 12D, and 12E traveling in the correct direction on the right-hand side of a divided roadway 10. Vehicles 13A, 13B, 13C, and 13D are shown traveling in the correct direction on the other side of a median 15 of the roadway 10. An exit ramp 14 is shown where vehicles traveling on the roadway 10 may exit to reach a street or roadway 16, which passes over the roadway 10. Street 16 has vehicles 18A and 18B traveling in the correct direction along the right side of street 16, and vehicle 18C is shown traveling in the correct direction on the opposite side of street 16.

The vehicle detector control system 2 of the roadway safety system continuously monitors the exit ramps of the tollway or highway to promptly detect a wrong-way vehicle as it enters the exit ramp. In FIG. 1, vehicle 19 is shown making an incorrect turn from street 16 to enter exit ramp 14 in the wrong direction. To this end, the vehicle detector control system 2 may be operatively connected to a first detector 7 which detects the presence and direction of the wrong-way vehicle 19, as it begins its entry onto exit ramp 14 in the wrong direction. The detector 7 may utilize any one of more suitable sensor technologies, such as magnetic coils in or below the surface of the exit ramp, a camera system to detect the presence of a wrong-way vehicle, electronic sensors in the form of photoelectric cells or image sensors, an electric eye system that projects one or more beams of light across the width of the ramp 14, or a pair of mechanical bars or pedals that are depressed by the front tires of the vehicle 19. The Federal Highway Administration has published an article describing some of these sensors, entitled "A New Look at Sensors," Issue No: Vol. 71, No. 3; Date: November/December 2007.

The sensors of detector 7 may be in-roadway sensors, by the roadway sensors or over-roadway sensors. A commonly used in-roadway sensor is the inductive loop detector which consists of loops of wire embedded into saw cuts in the road pavement. Other in-roadway sensors include magnetic detectors and wireless magnetometer vehicle detection systems. The Texas Department of Transportation ("TDOT") describes a wireless magnetometer vehicle detection system in a bid specification. TDOT, Traffic Operations Division, TO-8010, rev. 5-2015. Over roadway sensors include video image processors, microwave radar, laser radar, ultrasonic and passive infrared sensors installed alongside or above the exit ramp. Acoustic sensors could also be used alongside the roadway. The sensors, such as photoelectric cells, may be installed in pairs to produce information for determining the direction and speed of the vehicle. The University of Texas, Austin, Center for Transportation Research has published an article describing the use of photoelectric sensors, entitled "Photoelectric Sensors for Counting and Classifying Vehicles, J. E. Garner and L. Huang, Transportation Research Record 1311.

As depicted, the vehicle detector control system 2 is operatively connected to a surveillance system 6 which may be implemented with one or more cameras and/or RFID readers located in such a position to take a picture or image of the wrong-way vehicle 19, as well as detecting and reading vehicle identification such as may be found on a toll tag or other RFID technology devices on the vehicle. The camera(s) in the surveillance system 6 could also capture a picture of the front and/or rear license plate of the vehicle 19. The information could also include the vehicle registration sticker on the front windshield of the vehicle. In addition, the surveillance system 6 could also collect information from a tollway identification tag, whether the roadway to be protected is a tollway or a highway. The information captured by the surveillance system 6, including any visual or digital data from an RFID device, would be transmitted from the vehicle detector control system 2 to a central command center 3. The central command center 3 could take the vehicle identification information and initiate a computerized search to determine the mobile phone number associated with the driver/owner of the wrong-way vehicle 19 and then call that mobile phone to warn the driver that he/she is driving in the wrong direction.

The depicted roadway safety system also includes one or more drone docking stations 4, 5 that house and maintain drones that may be deployed. For example, each drone docking station 4, 5 could house one or more drones with electric motors that are charged at the docking station. When the detector 7 senses that the vehicle 19 has entered the ramp 14 in the wrong direction, the vehicle detector control system 2 and/or central command center 3 is programmed to automatically launch one or more drones to alert the driver that he/she is driving in the wrong direction. As will be described in greater detail below, the drones have sensors that detect and locate the vehicle, and then alert the driver by flying in front of vehicle 19 with alerts that may be visual signs and/or audible sounds to get the driver's attention and alert him/her to stop driving in the wrong direction. In addition or in the alternative, the drone(s) launched from the docking station(s) 4, 5 may attach themselves to the windshield or the body of the vehicle, such as the hood or roof, and broadcast visual or audible warnings to the driver that he/she is driving in the wrong direction. The release and launch of the drones would cause a signal to be broadcast to the central command center 3 to alert it to the detection of a wrong-way vehicle. The drones may be equipped with cameras to communicate images of the vehicle and/or the driver to the central command center 3. In response, the central command center 3 may also communicate visually and/or audibly with the driver, providing instructions to the driver on what actions need to be taken. Of course, all of the drones could be housed and energized in a single docking station instead of using two docking stations.

Figure 2:
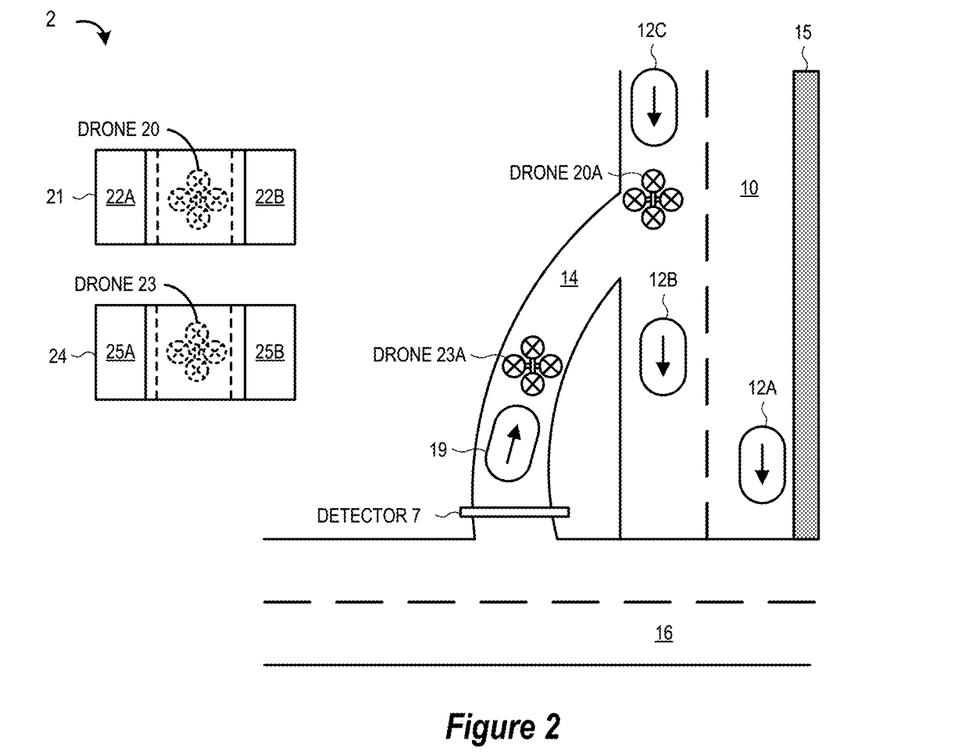
FIG. 2 shows a plan view of a drone warning system wherein one or more drones are deployed or launched toward and over an exit ramp to provide visual and/or audio alerts to a wrong-way vehicle and/or to alert drivers on the roadway ahead who are traveling towards this exit ramp in accordance with selected embodiments of the present disclosure.

To provide additional details for an improved understanding of selected embodiments of the present disclosure, reference is now made to FIG. 2, which shows a plan view 2 of a drone warning system wherein one or more drones 20, 23 are deployed or launched toward and over an exit ramp 14 to provide visual and/or audio alerts to a wrong-way vehicle 19 and/or to alert one or more other drivers (e.g., 12C) on the roadway ahead, who are traveling towards this exit ramp. As depicted, the drone warning system includes one or more drone docking stations 21, 24 with retractable covers 22A, 22B and 25A, 25B shown in the retracted position to allow the programmable drones 20, 23 to be launched. The drone docking stations 21, 24 allow for the drones 20, 23, which may be quadcopters, to take off and land and also provide a recharging capability for these robotic aircraft. The drones 20, 23 would typically be battery-powered multirotor and electric vertical take-off and landing (eVTOL) drones, though any suitable drone design may be used. With current technology, drones can move at speeds of 70 mph or more, which would enable them to quickly reach and stay up with the wrong-way vehicle 19 and be quickly deployed to reach oncoming traffic on the roadway 10, such as vehicle 12C. However, drones could also be powered by an internal combustion engine, but battery-powered drones may possess more advantages in this application. The drone docking stations 21, 24 may also provide an enclosure for storing the drones and protecting them from theft or damage from the weather. As indicated with the dashed lines, the covers 22A-B, 25A-B are shown in their open position with these covers retracted.

As indicated with the dotted lines, each drone 20, 23 may be located in a docking station 21, 24 before it is launched. In addition, the first drone 23 from the docking station 24 is shown at a remote location 23A, where it has been programmed to fly or hover in front of and over the wrong-way vehicle 19 to alert or warn the driver that he/she is driving the vehicle 19 in the wrong direction. Similarly, the second drone 20 from the docking station 21 is shown at a remote location 20A where it has been programmed to reach a position above a lane of traffic on roadway 10 to alert or warn a driver, such as a driver in vehicle 12C, not to take this exit ramp. If the wrong-way vehicle 19 somehow gets on the roadway 10, the first drone 23 could fly further down the road 10 in the direction of traffic headed towards the wrong-way vehicle 19 to warn approaching vehicles. In other embodiments, the drones 20A, 23A could be programmed to fly along with and hover over or near the wrong-way vehicle 19 to provide an alert or warning to vehicles traveling in the correct direction, such as by displaying a sign or illuminating or putting a spotlight on vehicle 19. As will be explained herein below, the drones 20A, 23A may also be equipped with cameras to relay the image of the vehicle or the traffic back to the central command center (not shown). In such embodiments, the command center could also communicate with the drones 20A, 23A to pilot them and control their actions. For example, the drones 20A, 23A could be designed and programmed to fly in front of our near the wrong-way vehicle 19 with a visible "WRONG WAY" sign, which could be an LED display, and/or with a speaker that could broadcast an audible warning to the vehicle.

In order for a drone (e.g., 23A) to fly or hover in front of and over the wrong-way vehicle 19, the drone may be preprogrammed and equipped with sensors (such as a camera system, radar sensors, motion sensor, or the like) to allow the drone, once launched, to identify the location and movement of the wrong-way vehicle 19 on the ramp 14. Alternatively, the drone may be preprogrammed with image recognition software which enables the drone to identify the wrong-way vehicle 19 based on image information captured by a camera or image sensor on the drone and/or captured by the surveillance system 6. In addition or in the alternative, the drone can be in communication with and under the control of the vehicle detector control system 2, central command center 3 and/or surveillance system 6 which can communicate vehicle location or image information to the drone which identifies the image or location or movement of the wrong-way vehicle 19 on the ramp 14. Once the location or image information for the wrong-way vehicle 19 is known, the drone may be programmed to adjust the propulsion system (e.g., speed and direction of one or more rotors) to move the drone toward the wrong-way vehicle so that it can hover in front of or over the wrong-way vehicle 19. In other embodiments, the drone may be pre-programmed upon launch to immediately move to an initial, predetermined location on the ramp 14 that would be in front of any wrong-way vehicle 19. In still other embodiments, the drone docking stations may be positioned on the ramp so that a drone is launched from a position on the ramp 14 that would be in front of any wrong-way vehicle 19.

Figure 3:
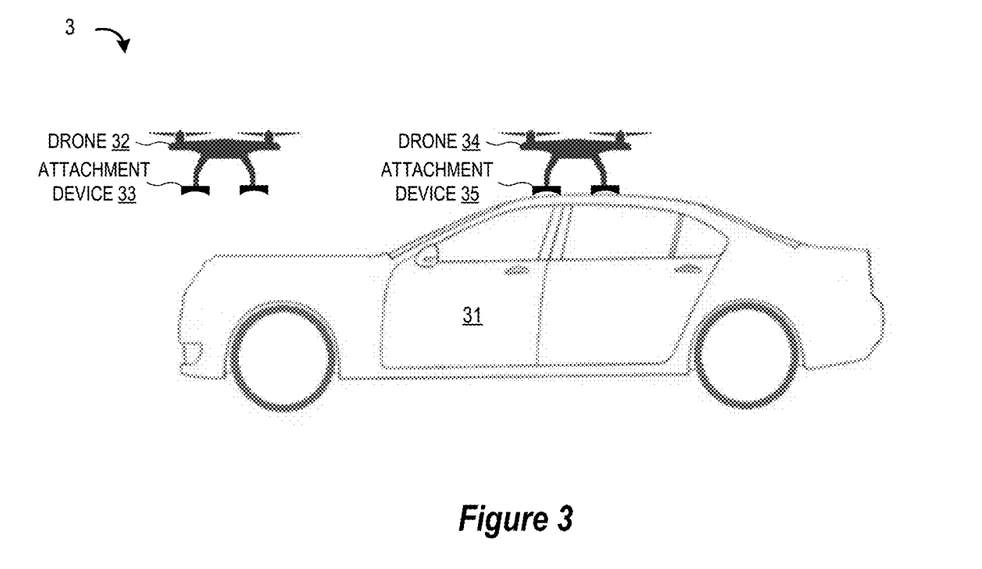
FIG. 3 shows a side or profile view of a wrong-way vehicle with one or more drones that have been attached to the body of the vehicle or fly or hover in front of the vehicle to alert the wrong-way driver in accordance with selected embodiments of the present disclosure.

To provide additional details for an improved understanding of selected embodiments of the present disclosure, reference is now made to FIG. 3, which shows a side or profile view 3 of a wrong-way vehicle 31 with one or more drones 32, 34 that are flown in front of the vehicle 31 or that have been attached to the body of the vehicle 31 to alert the wrong-way driver. As depicted, a first drone 32 has flown to hover in front of the wrong-way vehicle 31. In addition, a second drone 34 is depicted that has flown to and attached upon the roof top of the wrong-way vehicle 31. The drones 32, 34 may each be equipped with attachment devices 33, 35, such as suction cups or magnets, to attach to the vehicle 31. The drones may be designed to incorporate other technologies that would also attach or affix the drone to the vehicle 31, such as magnets. The attached drone(s) 32, 34 could be equipped with a GPS device to broadcast the location of the vehicle to the central command station and/or the highway patrol or police department. The drone(s) 32, 34 that are attached to the vehicle 19 may be equipped to alert the driver of vehicle 19 with a warning, such as a visible warning or an audible warning. In addition, the drone(s) 32, 34 may be equipped to warn drivers approaching the wrong-way vehicle of its presence on the exit ramp or its presence on roadway 10, if it should proceed the wrong-way onto the roadway 10.

In order to attach to the vehicle 31, each drone 32, 34 may be preprogrammed and equipped with sensors to allow it to attach to the vehicle 31 when they are launched toward the vehicle when it is detected on the exit ramp 14. In addition, the drones can be in communication with and under the control of the central command which can communicate with the driver of the vehicle 31 via visual signs, such as a static or a scrolling LED sign, text messages from the Command Center, or audible communications broadcast over speakers on the drones 32, 34. For example, the first drone 32 is shown flying in front of the vehicle 31 to enable it to send visual and/or audible warnings or instructions to the driver. Another drone 34 is shown attached to the roof of vehicle 31 for broadcasting audible communications to the driver and/or to provide warning signals to traffic approaching the vehicle 19 of its travel on the ramp 14 or roadway 10 in the wrong direction.

Figure 4:
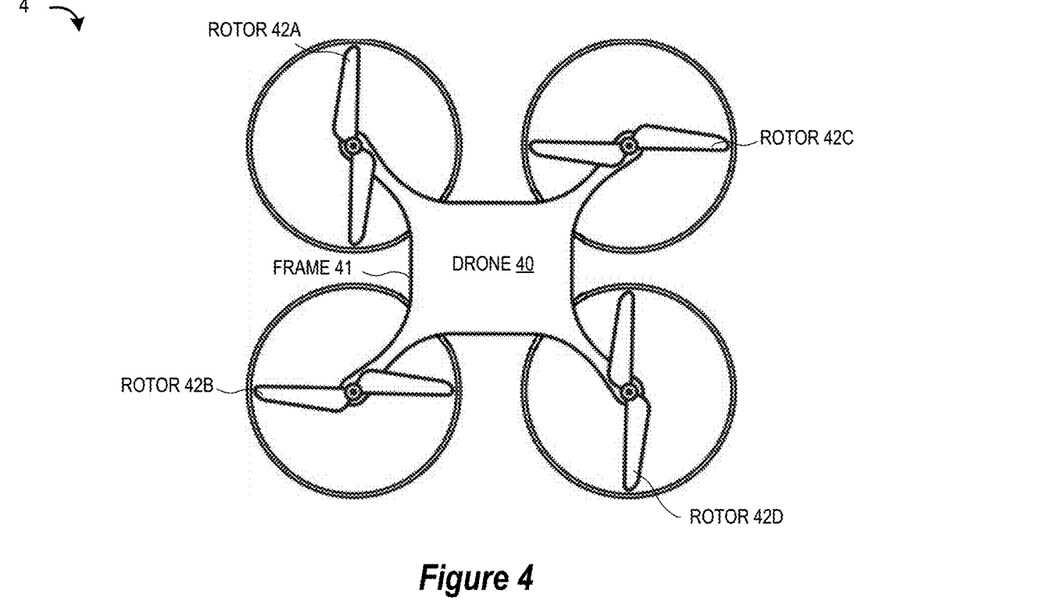
FIG. 4 shows a top or plan view of a drone in accordance with selected embodiments of the present disclosure.
Figure 5:
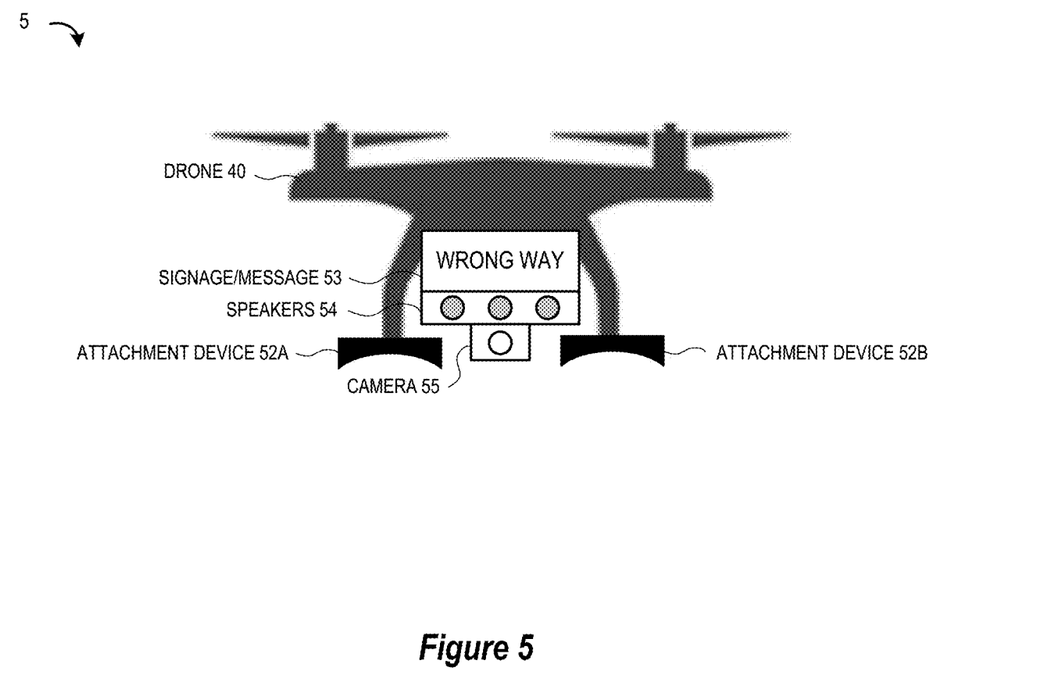
FIG. 5 shows a side or profile view of a drone in accordance with selected embodiments of the present disclosure.

To provide additional details for an improved understanding of selected embodiments of the present disclosure, reference is now made to FIG. 4 which shows a top or plan view 4 of a drone 40 which includes a plurality of rotors or propellers 42A-D connected to a quadcopter frame 41 which houses the motor(s), speed controllers, flight controller boards, radio transmitters, battery, electronics, and power distribution cables. In addition, reference is made to FIG. 5 which shows a side or profile view 5 of the drone 40, which includes a signage or message panel 53 that says "WRONG WAY," a set of speakers 54 which can broadcast audible signals or instructions, and a camera system 55 that may record and relay pictures of the driver of the wrong-way vehicle and/or the surrounding area. The signage/message panel 53 may be an LED light display system that enables it to display messages that are either preprogrammed or created by the central command center if it takes over the control of the drone 40. The camera system 55 may be mounted so it may be rotated 360 degrees to take pictures of a wrong-way vehicle and its surrounding environment.

Figure 6:
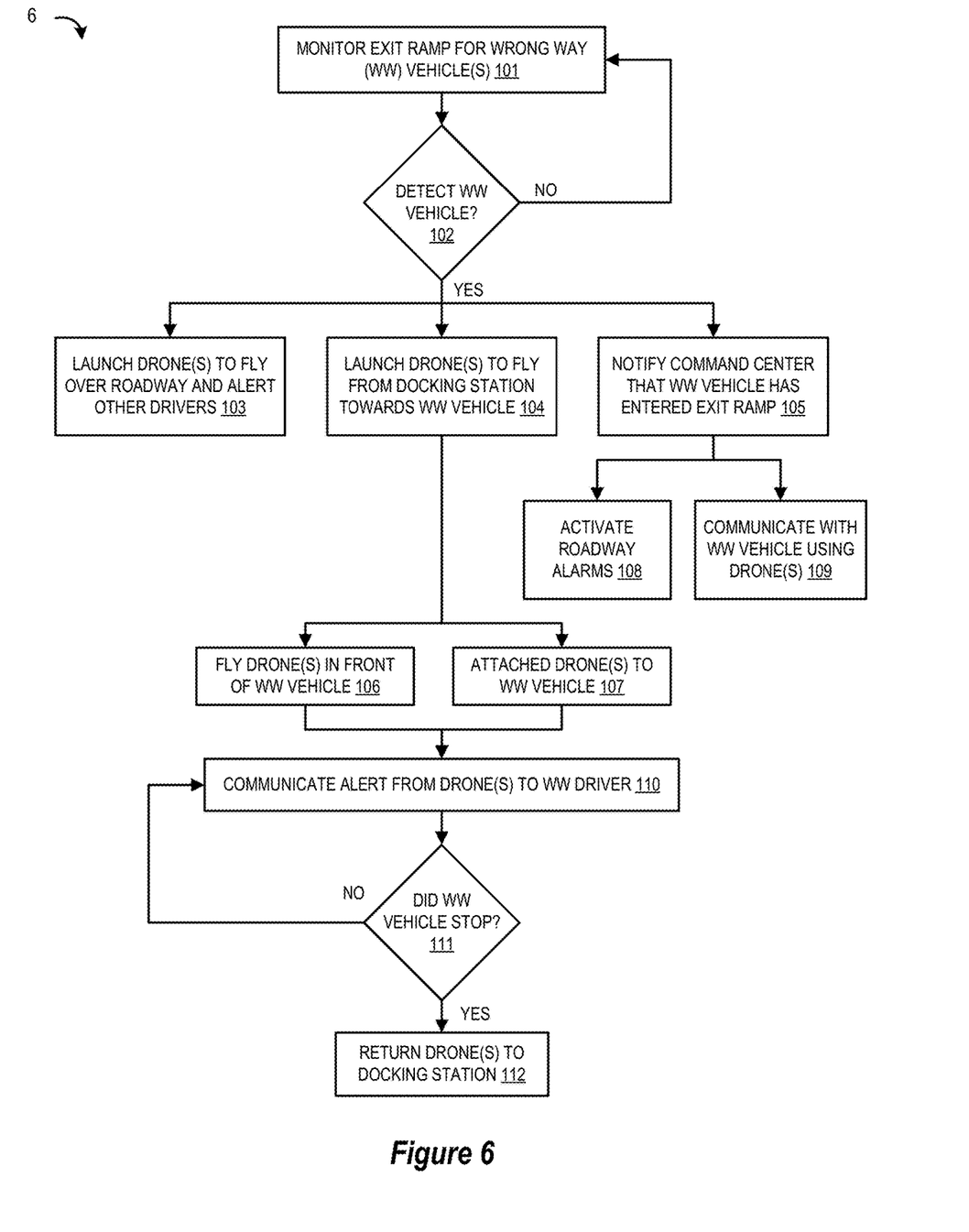
FIG. 6 illustrates a simplified flow chart showing the logic for operating a roadway safety system in accordance with selected embodiments of the present disclosure.

To provide additional details for an improved understanding of selected embodiments of the present disclosure, reference is now made to FIG. 6, which illustrates a simplified flow chart 6 showing the logic for operating a roadway safety system. As will be appreciated, the disclosed methodology may be implemented with a vehicle detector control system which is operatively connected with one or more vehicle detector sensors and/or surveillance systems, a central command center, and/or one or more drone docking stations and/or drones to detect a wrong-way vehicle and to deploy the drone(s) to provide warnings to at least the driver of the wrong-way vehicle.

At step 101, the road safety system monitors an exit ramp for wrong-way (WW) vehicles. With reference to the example of FIG. 1, step 101 may be implemented by the vehicle detection control system 2, which uses a detector 7 and/or surveillance system 6 to continuously monitor the exit ramp 14 to detect the presence of a wrong-way vehicle (e.g., vehicle 19).

At step 102, the road safety system monitors detects a WW vehicle on the ramp. If there is no WW vehicle detected (negative outcome to detection step 102), the roadway safety system continues monitoring the exit ramp (step 101). However, when a WW vehicle is detected (affirmative outcome to detection step 102), the roadway safety system generates a detection signal which can be used to initiate a number of different responses.

In selected embodiments, the road safety system responds to the detection signal at step 103 by launching one or more drones to fly over the roadway and alert other drivers about the WW vehicle. With reference to the example of FIG. 2, step 103 may be implemented by the vehicle detection control system launching the drone 20A towards the vehicle 12C on the roadway 10 to provide a warning that a WW vehicle 19 has been detected on the exit ramp 14. In the alternative, the drone 20 may be programmed to fly to a specific place on the roadway, e.g., a predetermined distance from the entrance of the exit ramp.

In other embodiments, the road safety system responds to the detection signal at step 104 by launching one or more drones to fly from the docking station towards the WW vehicle. With reference to the example of FIG. 2, step 104 may be implemented by the vehicle detection control system launching the drone 23A towards the WW vehicle 19 on the exit ramp 14. In such embodiments, the drone(s) may be preprogrammed to fly in front of the WW vehicle (step 106) and communicate alerts or warnings, visual or audible, to the driver of the wrong-way vehicle (step 110). In addition or in the alternative, the drone(s) may be preprogrammed to attach to the WW vehicle (step 107) and then communicate alerts to the driver as well (step 110). Though not shown, it will be appreciated that the drone(s) may also be preprogrammed to communicate alerts to other vehicles approaching the WW vehicle.

At step 111, the road safety system detects if the WW vehicle has stopped or backed out of the exit ramp. If the WW vehicle did not stop (negative outcome to detection step 111), the roadway safety system continues to provide alerts (step 110). However, upon detecting that the WW vehicle has stopped (affirmative outcome to detection step 111), the drone(s) may then fly back to the docking station (step 112).

In other embodiments, the road safety system responds to the detection signal at step 105 by notifying the command center and/or vehicle detector control system that a WW vehicle has entered the exit ramp. With reference to the example of FIG. 1, step 105 may be implemented by the vehicle detection control system 2 detecting the WW vehicle 19 with the detector 7, and then sending a signal to the central command center 3. In response, the command center 3 and/or vehicle detector control system 2 may activate one or more roadway alarms along the exit ramp 14 and roadway 10 at step 108. With reference to the example of FIG. 1, step 108 may be implemented by the central command center 3 activating warning signage or/and audio speakers (not shown) positioned along the roadway 10 or exit ramp 14 to provide an alert that WW vehicle has been detected on the exit ramp 14. In addition or in the alternative, the command center and/or vehicle detector control system may establish a communication link to communicate with the WW vehicle using the drones at step 109. With reference to the example of FIG. 5, step 109 may be implemented by deploying a drone 40 which includes a signage or message panel 53 and/or a set of audio speakers 54.

Figure 7:
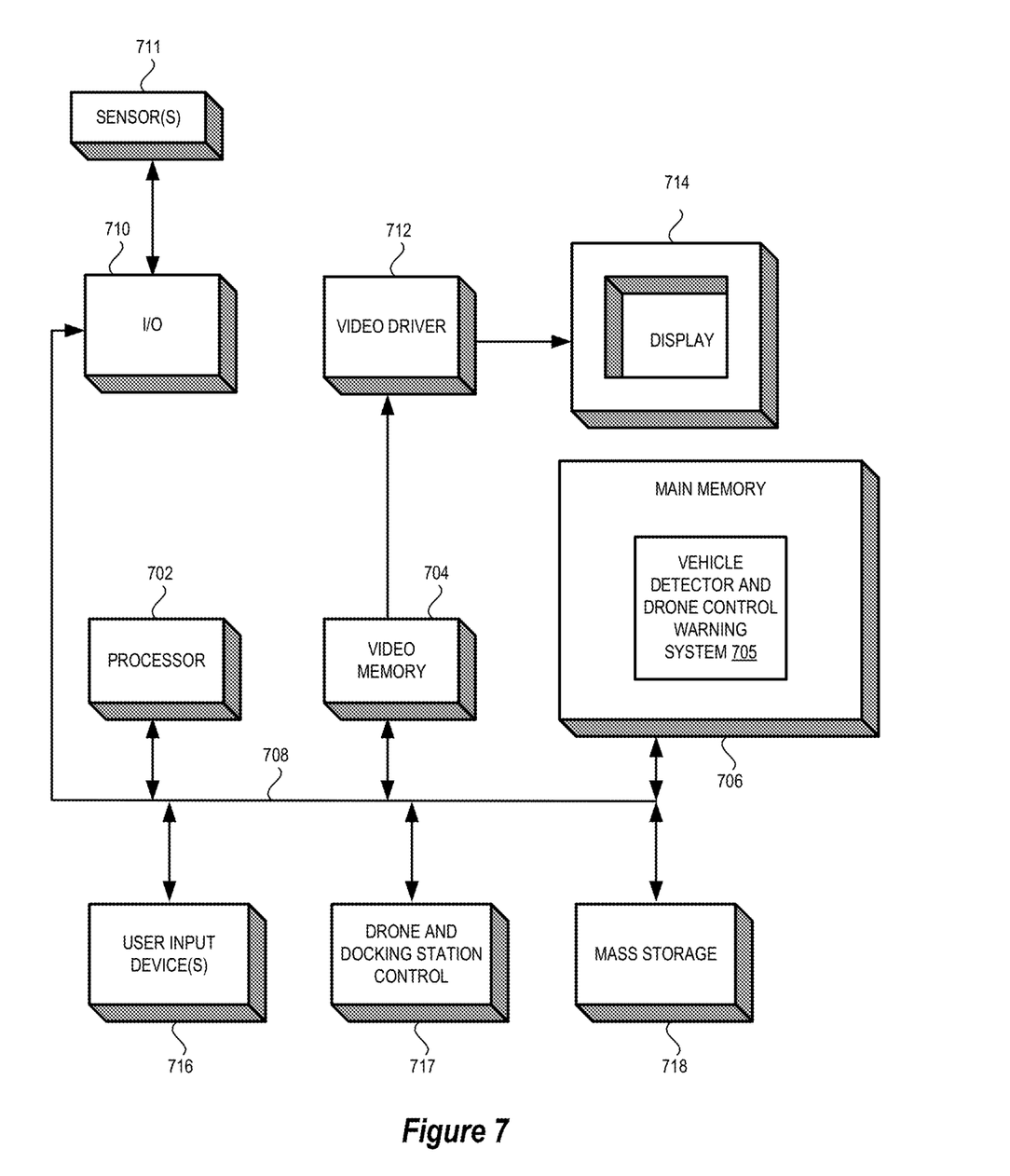
FIG. 7 is a simplified block diagram of a computer-based implementation of a vehicle detection and drone deployment system in accordance with selected embodiments of the present disclosure.

To provide additional details for an improved understanding of selected embodiments of the present disclosure, reference is now made to FIG. 7, which is a simplified block diagram of a computer-based implementation of a vehicle detection and drone deployment system in accordance with selected embodiments of the present disclosure.

To provide additional details for an improved understanding of selected embodiments of the present disclosure, reference is now made to FIG. 7, which depicts a simplified block diagram of a computer-based system 7 for implementing a vehicle detector and drone control warning system 705. As disclosed, the computer-based system 7 includes input user device(s) 716, such as a control panel, keyboard and/or mouse, which are coupled to a bi-directional system bus 708. The input user device(s) 716 are used for introducing user input to the computer-based system 7 and communicating that user input to one or more processors 702. The computer-based system 7 may also include a video memory 704, main memory 706, I/O device(s) 710, drone and docking station control 717, and mass storage 718, all coupled to bi-directional system bus 708 along with input user device(s) 716 and processor(s) 702. The mass storage 718 may include both fixed and removable media, such as other available mass storage technology. Bus 708 may contain, for example, 32 address lines for addressing video memory 704 or main memory 706. The system bus 708 may also include, for example, an n-bit data bus for transferring data between and among the components, such as CPU 702, video memory 704, main memory 706, and mass storage 718, where "n" is, for example, 32 or 64. Alternatively, multiplex data/address lines may be used instead of separate data and address lines.

The computer-based system 7 also includes one or more I/O device(s) 710 which provide connections to peripheral devices, including one or more sensors 711, such as magnetic sensors, electronic sensors, photoelectric sensors, cameras and physical sensors such as used by the vehicle detector and drone control warning system 705. The I/O device(s) 710 may also provide a direct connection to remote server computer systems via a telephone link or to the Internet via an ISP, a wireless link, or the like. I/O device(s) 710 may also include a network interface device to provide a direct connection to remote server computer systems via a direct network link to the Internet via a POP (point of presence). Such connection may be made using, for example, wireless techniques, including digital cellular telephone connection, Cellular Digital Packet Data (CDPD) connection, digital satellite data connection or the like. Examples of I/O devices include modems, sound and video devices, and specialized communication devices such as the aforementioned network interface.

Computer programs and data are generally stored as instructions and data in mass storage 718 until loaded into main memory 706 for execution. Computer programs may also be in the form of electronic signals modulated in accordance with the computer program and data communication technology when transferred via a network. The method and functions relating to system and method for providing a roadway safety system are stored with computer program code embodying the vehicle detector and drone control warning system 705. As will be appreciated, once the computer-based system 7 is configured to implement the vehicle detector and drone control warning system 705, the computer-based system 7 becomes a specialized computing device specifically configured to implement the mechanisms of the illustrative embodiments and is not a general-purpose computing device. Moreover, as described hereafter, the implementation of the mechanisms of the illustrative embodiments improves the functionality of the computing device and provides a useful and concrete result that facilitates the road safety improvements by allowing dangerous wrong-way vehicles to be detected and stopped before a head on collision can happen.

The processor 702, in one embodiment, is a microprocessor manufactured by Motorola Inc. of Illinois, Intel Corporation of California, Nvidia Corporation of California, or Advanced Micro Devices of California. However, any other suitable single or multiple microprocessors or microcomputers may be utilized. Main memory 706 is comprised of dynamic random access memory (DRAM). Video memory 704 is a dual-ported video random access memory.

One port of the video memory 704 is coupled to video amplifier or driver 712. The video amplifier or driver 712 is used to drive the display 714. Video amplifier 712 is well known in the art and may be implemented by any suitable means. This circuitry converts pixel data stored in video memory 704 to a raster signal suitable for use by display 714. Display 714 is a type of monitor suitable for displaying graphic images.

Under control of the processor(s) 702, the principal hardware elements of the road safety system include the sensor(s) 711 for detecting the presence and/or vehicle identification number of any wrong-way vehicle(s), the drone and docking station control 717 which controls the operation of the drone docking stations and/or the deployment of one or more drones in response to detecting wrong-way vehicles, and the vehicle detector and drone control warning system 705 for monitoring the sensor(s) 711, activating and deploying one or more warning drones, notifying the command center of wrong-way vehicles, activating roadway alarms, capturing vehicle identification numbers, sending vehicle identification numbers to the command center, and/or contacting the wrong-way vehicle to alert the driver. For example, a first sensor 711 may be provided to detect that a vehicle has entered an exit ramp in the wrong direction, a second sensor 711 may be provided to detect that the vehicle has continued to drive down the exit ramp in the wrong direction, and these sensors may provide sensor data over the I/O device(s) 710 to the processor(s) 702 for storage and/or processing to detect that a vehicle is entering an exit ramp in the wrong direction as it drives onto the exit ramp, to transmit a signal to a vehicle detector and drone control warning system that a vehicle is entering the exit ramp in the wrong direction, and to activate and deploy one or more drones to alert the wrong-way vehicle and other vehicles that the wrong-way vehicle is driving in the wrong direction.

While the invention has been described in connection with what is presently considered to be the most practical and preferred embodiment, it will be appreciated that other variations and alternatives to the disclosed examples are also contemplated, and the present invention is not necessarily limited to the example embodiments, which illustrate inventive aspects of the present invention that are applicable to various roadway safety and drone warning system applications. Thus, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as are permitted under the law. Accordingly, the foregoing description is not intended to limit the invention to the particular form set forth, but on the contrary, is intended to cover such alternatives, modifications and equivalents as may be included within the spirit and scope of the invention as defined by the appended claims so that those skilled in the art should understand that they can make various change, substitutions and alterations without departing from the spirit and scope of the invention in its broadest form.

By now, it should be appreciated that there has been provided an apparatus, method, program code, and roadway safety system for reducing accidents caused by vehicles entering an exit ramp from a roadway in the wrong direction. In the disclosed methodology, one or more robotic drones are maintained at a drone docking station(s) located at or near an exit ramp. The disclosed methodology also includes monitoring the exit ramp to detect a wrong-way vehicle that enters the exit ramp in a wrong direction. In addition, the disclosed methodology includes transmitting a first communication signal to a safety control system upon detecting the wrong-way vehicle. The disclosed methodology also includes launching at least a first robotic drone from the one or more robotic drones toward the wrong-way vehicle in response to the first communication signal. In addition, the disclosed methodology includes generating an alert or warning message from at least the first robotic drone to notify a driver of the wrong-way vehicle that the wrong-way vehicle is traveling in the wrong direction. In selected embodiments, one or more of the robotic drones are preprogrammed to display a visual message or sign that alerts the driver of the wrong-way vehicle that the wrong-way vehicle is traveling in the wrong direction. In other selected embodiments, each robotic drone may include an attachment device (e.g., suction cup or magnet) which is operably configured for attachment to a surface of the wrong-way vehicle. In selected embodiments, the disclosed methodology may also include launching at least a second robotic drone from the one or more robotic drones to travel along a roadway connected to the exit ramp to alert an additional driver traveling on the roadway that a wrong-way vehicle has been detected ahead of said additional driver. In other selected embodiments, the disclosed methodology may also include controlling at least the first robotic drone to hover in a position in front of the wrong-way vehicle or any vehicles exiting onto the exit ramp from a roadway and to provide an alert that the wrong-way vehicle has been detected.

In another form, there is provided a roadway safety system, apparatus, method, and program code for reducing accidents caused by vehicles entering an exit ramp from a roadway from the wrong direction. The disclosed roadway safety system includes one or more sensors connected and configured to monitor an exit ramp to detect a wrong-way vehicle that enters the exit ramp in a wrong direction. The disclosed roadway safety system also includes one or more battery-powered electric vertical take-off and landing (eVTOL) drones. In addition, the disclosed roadway safety system includes a first drone docking station for housing and energizing the one or more battery-powered eVTOL drones. The disclosed roadway safety system also includes a vehicle detection and drone control system connected to said one or more sensors to detect the wrong-way vehicle and to transmit a first signal to launch one or more of the battery-powered eVTOL drones from said first drone docking stationed to fly towards the wrong-way vehicle and provide an alert that the wrong-way vehicle is traveling in the wrong direction. In selected embodiments, the disclosed roadway safety system may also include a second drone docking station for housing and energizing one or more additional battery-powered eVTOL robotic drones, where said vehicle detection and drone system is connected and configured to respond to detection of the wrong-way vehicle by transmitting a second signal to launch one or more of the additional battery-powered eVTOL drones from said second drone docking station to fly towards oncoming traffic that is proceeding down the exit ramp in a correct direction and to provide an alert to the oncoming traffic that the wrong-way vehicle is traveling in the wrong direction on the exit ramp. In selected embodiments, at least one of the battery-powered eVTOL drones includes an attachment device which is operably configured for attachment to a surface of the wrong-way vehicle. In other selected embodiments, at least one of the battery-powered eVTOL drones includes an electronic signage or message panel which conveys the alert that the wrong-way vehicle is traveling in the wrong direction. In other selected embodiments, at least one of the battery-powered eVTOL drones includes one or more audio speakers which convey the alert that the wrong-way vehicle is traveling in the wrong direction. In other selected embodiments, at least one of the battery-powered eVTOL drones includes an image, location or camera sensor that captures image or location information for the wrong-way vehicle. In other selected embodiments, at least one of the battery-powered eVTOL drones includes a global position system (GPS) unit configured to identify a location of the wrong-way vehicle for transmission to a command center. In other selected embodiments, at least one of the battery-powered eVTOL drones is configured to identify a location of the wrong-way vehicle for transmission to a command center. In other selected embodiments, at least one of the battery-powered eVTOL drones is configured for two-way communication with a command center to control movement and/or alert messaging of the first battery-powered eVTOL drone.

In yet another form, there is provided an apparatus, method, program code, and roadway safety system for reducing accidents caused by vehicles entering an exit ramp from a roadway from the wrong direction. In the disclosed methodology, a roadway is monitored to detect a wrong-way vehicle that enters the roadway in a wrong direction with a vehicle detector system. Upon detecting the wrong-way vehicle, a vehicle detection signal is transmitted to a vehicle detector control system. And in response to the vehicle detection signal, one or more flying drones are deployed to fly in front of the wrong-way vehicle and to generate an alert or warning message to notify a driver of the wrong-way vehicle that the wrong-way vehicle is traveling in the wrong direction. In selected embodiments, at least one of the one or more flying drones includes an attachment device which is operably configured for attachment to a surface of the wrong-way vehicle. The disclosed methodology may also display, by the one or more flying drones, a visual message or sign that alerts the driver of the wrong-way vehicle that the wrong-way vehicle is traveling in the wrong direction. In addition, the disclosed methodology may also deploy one or more additional flying drones in response to the vehicle detection signal to travel along the roadway to alert an additional driver traveling on the roadway that a wrong-way vehicle has been detected ahead of said additional driver. In selected embodiments, the disclosed methodology also includes controlling at least a first flying drone to hover in a position in front of the wrong-way vehicle or any vehicles on the roadway and to provide an alert that the wrong-way vehicle has been detected. In addition, the disclosed methodology may also include exchanging information between a command center and the one or more flying drones to identify a location of the wrong-way vehicle.

While the invention has been described in connection with what is presently considered to be the most practical and preferred embodiment, it will be appreciated that other variations and alternatives to the disclosed examples are also contemplated, and the present invention is not necessarily limited to the example embodiments, which illustrate inventive aspects of the present invention that are applicable to various roadway safety applications. Thus, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law. Accordingly, the foregoing description is not intended to limit the invention to the particular form set forth, but on the contrary, is intended to cover such alternatives, modifications and equivalents as may be included within the spirit and scope of the invention as defined by the appended claims so that those skilled in the art should understand that they can make various changes, substitutions and alterations without departing from the spirit and scope of the invention in its broadest form.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. The term "coupled," as used herein, is not intended to be limited to a direct coupling or a mechanical coupling. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method for preventing wrong way collisions on a roadway, comprising:
   continuously monitoring an exit ramp of the roadway with sensors positioned at an exit end of the exit ramp to promptly detect any wrong way vehicle as the wrong way vehicle begins to enter the exit ramp from a wrong direction;
   transmitting an electronic signal from said sensors to a roadway safety system upon detecting a wrong way vehicle entered the exit ramp from the wrong direction;
   maintaining a robotic drone station that houses one or more preprogrammed robotic drones at a position on the exit ramp in front of any wrong way vehicle, said one or more preprogrammed robotic drones being controlled by said roadway safety system;
   launching at least a first preprogrammed robotic drone from the robotic drone station in response to a detection signal from said sensors indicating the wrong way vehicle entered the exit ramp from the wrong direction;
   intercepting the wrong way vehicle with said first preprogrammed robotic drone when the wrong way vehicle is on the exit ramp before reaching the roadway by flying the first preprogrammed robotic drone to fly in advance of and in front of the wrong way vehicle at a height and position to be visible to a driver of the wrong way vehicle; and
   generating a warning to the driver of the wrong way vehicle from said first preprogrammed robotic drone that the wrong way vehicle is traveling in the wrong direction to enable the driver to stop the wrong way vehicle before it reaches the roadway.

2. The method of claim 1, further comprising:
   attaching the first preprogrammed robotic drone to the wrong way vehicle in a position on the wrong way vehicle to warn the driver of the wrong way vehicle.

3. The method of claim 2, where attaching said first preprogrammed robotic drone to the wrong way vehicle comprises attaching the first preprogrammed robotic drone to a hood, roof or windshield of the wrong way vehicle with suction cups as the wrong way vehicle moves on the exit ramp.

4. The method of claim 1, further comprising:
launching a second preprogrammed robotic drone from said drone docking station in response to the detection signal; and
flying said second preprogrammed robotic drone to reach a position above the roadway and to generate an alert from said second preprogrammed robotic drone to any drivers traveling on the roadway not to take the exit ramp.

5. The method of claim 1, further comprising:
sensors for detecting a vehicle identification number of the wrong way vehicle; and
communicating the detected vehicle identification number of the wrong way vehicle to a command center of the roadway safety system.

6. The method of claim 5, further comprising:
searching for a mobile phone number associated with the driver of the wrong way vehicle; and
calling the mobile phone number to warn the driver of the wrong way vehicle that the driver is traveling in the wrong direction.

7. The method of claim 1, where transmitting the electronic signal from said sensors to the roadway safety system occurs when a front tire of the wrong way vehicle enters the exit ramp in the wrong direction.

8. The method of claim 1, where transmitting the electronic signal from said sensors to the roadway safety system occurs when a front tire of the wrong way vehicle passes the sensors after entering the exit ramp in the wrong direction.

9. A method for preventing wrong way collisions on a roadway, comprising:
continuously monitoring an exit ramp from the roadway with sensors positioned at an exit end of the exit ramp to promptly detect any wrong way vehicle as the wrong way vehicle begins to enter the exit ramp in a wrong direction;
transmitting an electronic signal from said sensors to a roadway safety system once the wrong way vehicle is detected entering the exit ramp;
detecting a vehicle identification number of the wrong way vehicle;
transmitting the detected vehicle identification number to the roadway safety control system;
determining a mobile phone number associated with the vehicle identification number;
maintaining one or more preprogrammed robotic drones at a drone docking station located at or nearby the exit ramp, said one or more preprogrammed robotic drones being controlled by the roadway safety system;
launching at least a first preprogrammed robotic drone in response to a detection signal from the roadway safety system that is generated in response to detecting the wrong way vehicle entering the exit ramp;
intercepting the wrong way vehicle with the first preprogrammed robotic drone when the wrong way vehicle is on the exit ramp before reaching the roadway by flying the first preprogrammed robotic drone to fly in front of and over the wrong way vehicle;
generating a warning to a driver of the wrong way vehicle from said first preprogrammed robotic drone that the wrong way vehicle is traveling in the wrong direction to enable the driver to stop the wrong way vehicle before it leaves the roadway; and
calling the mobile phone number associated with the vehicle identification number to warn the driver of the wrong way vehicle before the wrong way vehicle leaves the exit ramp and enters the roadway.

10. The method of claim 9, further comprising:
equipping the first preprogrammed robotic drone with an attachment device for attaching the first preprogrammed robotic drone to a moving wrong way vehicle, and
attaching the attachment device of said first preprogrammed robotic drone to the wrong way vehicle as the wrong way vehicle is on the exit ramp before reaching the roadway.

11. A method for preventing wrong way collisions on a tollway, comprising:
continuously monitoring an exit ramp from the tollway with sensors positioned at an exit end of the exit ramp to promptly detect any wrong way vehicle as the wrong way vehicle begins to enter the exit ramp;
transmitting an electronic signal from said sensors to a roadway safety system upon detecting a wrong way vehicle has entered the exit ramp from the wrong direction;
detecting a vehicle identification number of the wrong way vehicle with a toll tag RFID reader located at the exit ramp to read the toll tag of a wrong way vehicle;
transmitting the vehicle identification number to the roadway safety system;
identifying a mobile phone number associated with the vehicle identification number;
maintaining a drone docking station at or near the exit ramp for housing and energizing one or more preprogrammed eVTOL robotic drones which are each controlled by signals from the roadway safety system;
launching a first preprogrammed eVTOL robotic drone towards the wrong way vehicle in response to a detection signal that is generated by the roadway safety system in response to detecting the wrong way vehicle entering the exit ramp;
intercepting the wrong way vehicle with the first preprogrammed eVTOL robotic drone when the wrong way vehicle is on the exit ramp before reaching the tollway by flying the first preprogrammed eVTOL robotic drone to fly in advance of and in front of the wrong way vehicle at a height and position to be visible to a driver of the wrong way vehicle;
generating a warning signal to a driver of the wrong way vehicle from the first preprogrammed eVTOL robotic drone that the wrong way vehicle is travelling in the wrong direction;
attaching an attachment device on said first preprogrammed eVTOL robotic drone to the wrong way vehicle as the wrong way vehicle is on the exit ramp before reaching the tollway;
launching a second preprogrammed eVTOL robotic drone from the drone docking station towards the tollway in response to the detection signal;
flying said second preprogrammed eVTOL robotic drone above the tollway to provide one or more warning signals to vehicle drivers driving on the tollway in the correct direction before reaching an entrance to the exit ramp that a wrong way vehicle has entered the exit ramp from the wrong direction; and
initiating a call from a command center at the roadway safety system to the mobile number associated with the detected vehicle identification number to establish a line of communication to the driver of the wrong way vehicle.

12. A method for preventing wrong-way vehicle accidents on an exit ramp of a roadway comprising:
- maintaining one or more robotic drones at a drone docking station;
- monitoring the exit ramp with roadway sensors positioned at an exit end of the exit ramp to detect a wrong-way vehicle that enters the exit ramp in a wrong direction;
- transmitting a first communication signal from the roadway sensors to a safety control system upon detecting the wrong-way vehicle while the wrong-way vehicle is on the exit ramp;
- launching at least a first robotic drone from the drone docking station toward the wrong-way vehicle in response to the first communication signal, where the first robotic drone comprises an attachment device which is operably configured for attachment to a surface of the wrong-way vehicle;
- attaching the attachment device of said first preprogrammed robotic drone to the wrong-way vehicle as the wrong way vehicle is on the exit ramp before reaching the roadway; and
- generating an alert or warning message from at least the first robotic drone to notify a driver of the wrong-way vehicle that the wrong-way vehicle is traveling in the wrong direction.

13. A method for preventing wrong-way vehicle accidents on an exit ramp of a roadway comprising:
- maintaining one or more robotic drones at a drone docking station;
- monitoring the exit ramp with roadway sensors positioned at an exit end of the exit ramp to detect a wrong-way vehicle that enters the exit ramp in a wrong direction;
- transmitting a first communication signal from the roadway sensors to a safety control system upon detecting the wrong-way vehicle;
- launching at least a first robotic drone from the drone docking station toward the wrong-way vehicle in response to the first communication signal;
- generating an alert or warning message from at least the first robotic drone to notify a driver of the wrong-way vehicle that the wrong-way vehicle is traveling in the wrong direction; and
- launching at least a second robotic drone from the drone docking station to reach a position above the roadway and to generate an alert to alert an additional driver traveling on the roadway that a wrong-way vehicle has been detected on the exit ramp ahead of said additional driver.

* * * * *